May 11, 1954
K. EISENBURGER
2,678,367
ELECTRIC RESISTANCE WELDING MACHINE
FOR SPOT OR SEAM WELDING
Filed Aug. 27, 1949
3 Sheets-Sheet 1
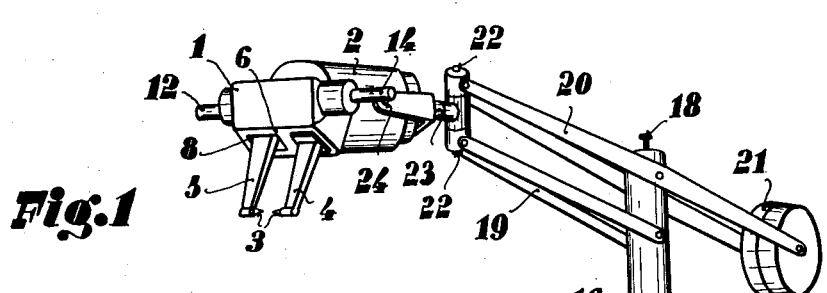
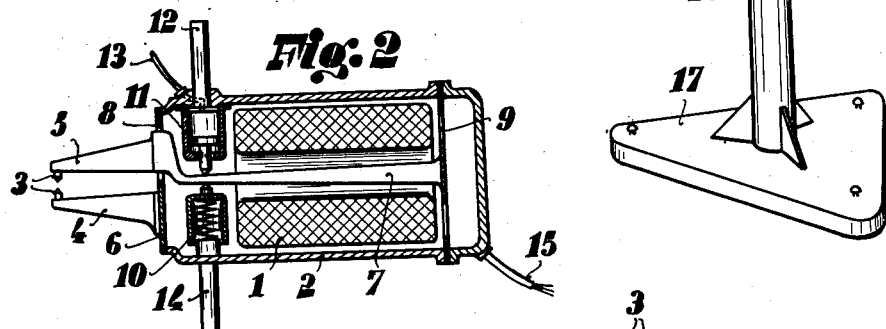
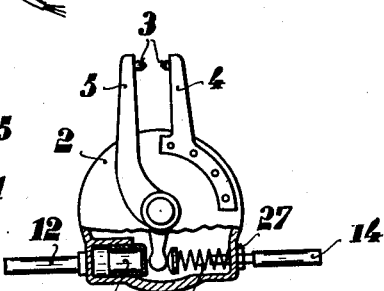
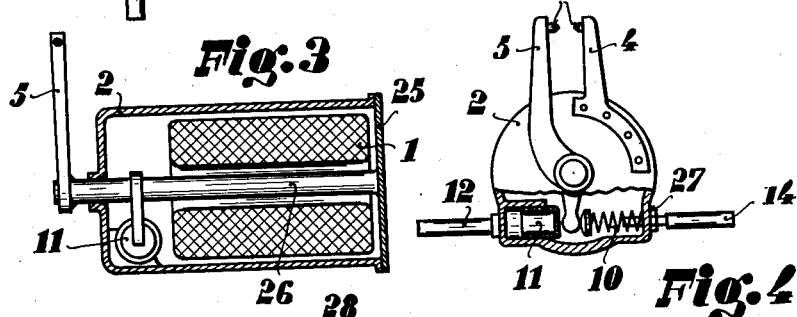
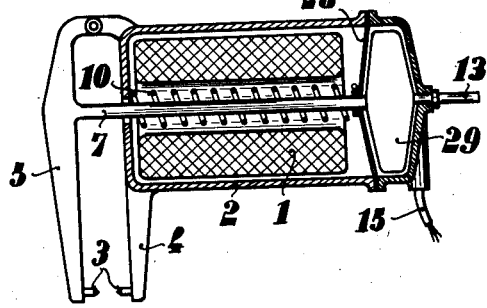
INVENTOR.
Kuno Eisenburger
BY Mock & Blum
ATTORNEYS May 11, 1954  K. EISENBURGER  2,678,367
ELECTRIC RESISTANCE WELDING MACHINE
FOR SPOT OR SEAM WELDING
Filed Aug. 27, 1949  3 Sheets-Sheet 2

INVENTOR.
Kuno Eisenburger
BY  Mock & Blum
ATTorneys

Patented May 11, 1954

2,678,367

UNITED STATES PATENT OFFICE 2,678,367

ELECTRIC RESISTANCE WELDING MACHINE FOR SPOT OR SEAM WELDING

Kuno Eisenburger, Wels, Austria, assignor to M & S Maschinen Und Stahl A. G., Zollikon-Zurich, Switzerland Application August 27, 1949, Serial No. 112,701

9 Claims. (Cl. 219—4)

This invention relates to improvements in electric resistance welding machines for spot or seam welding.

The primary object of the invention is the provision of a machine of this type especially adapted for joining hardly accessible parts. The welding machine according to the invention is distinguished by high electrical efficiency and is, therefore, relatively small and of light weight.

In various known resistance welding machines the transformer is separated from the parts carrying the electrodes (welding tongs). This results in considerable disadvantages in operation and also in limited applicability.

Due to its great line losses, described hereinafter, in the secondary circuit, the transformer is usually mounted at the ceiling, a wall or a separate support, and at best movable only in a limited way. Supply of the low tension secondary current to the proper welding means is effected by thick flexible cables which are of high carrying capacity. However, in order to accomplish their object, the welding tongs have to be very handy, i. e. capable of being turned into any direction. In view of this very long cables are required whereas with regard to other purposes—such as elimination of unnecessary losses, reduction of weight and connected load of the transformer—the cables should be as short as possible. Short thick cables, however, substantially impair the movability of conventional welding tongs. Therefore the mechanical requirements are contradictory to the electrical requirements, and prevent a solution which would be satisfactory in both respects.

In addition to that the forces for exerting the electrode pressure in welding tongs of the usual power are too great for being produced by hand, but require transmitting of force mostly by compressed air or oil pressure. Such devices cause an increase of the weight of the movable aggregate and require its suspension by a pulley block or the like, thus again hindering the desired movability.

These drawbacks are overcome according to my invention by fixing or mounting the welding electrodes with their holders directly to the casing of the machine surrounding the transformer and at the same time forming the secondary of the latter, wherein at least one of the electrode holders is made of elastic material, or is fixed to or moved in contact with an elastic part of the casing, so that the supply of secondary current to the electrodes is effected by the said connecting parts only.

By rendering elastic one or several of the connecting parts carrying the electrodes, the mutual movability of the same for opening and closing, is obtained and therefore supply of the secondary current to the electrodes is effected by the said connecting parts only, without any additional flexible cables.

Now, the means for continuous control of the electrode pressure as well as those for opening the electrodes can be mounted without impairing the movability. It is contemplated to control one of the two steps of working (movement of electrodes) by pneumatic or hydraulic means, using, if desired, the available cooling water, and the other step by spring action, which may be produced by the elasticity of the connecting parts carrying the electrode.

Such elastic connecting parts are preferably provided on the one hand by suitable elastic parts of the bottom of the machine casing, or a partition inserted into the casing, on the other hand by the arm carrying the movable electrode.

According to the invention the handles of the welding tongs are used as controlling means for effecting the electrode movements.

The electrical efficiency of the transformer is greatly increased by the suppression of the supply cables and their losses (line losses and intermediate resistances), and it becomes thus possible to use a smaller transformer in comparison with known welding machines of the same output, and to assemble it with the welding tongs. By these means an extremely handy welding aggregate is provided, which is easy to attend and comprises only those parts which are necessary under any circumstances. By a Cardan-like suspension or mounting on a balanced two-armed lever, adjustable about several axes, it can be turned in any direction and is capable of operating in large sphere of action.

The rather uncomplicated construction of the welding machine according to my invention is also well adapted for the stationary type, which can be used for welding hardly accessible parts, tubes of any length, longitudinal and transversal seams of vessels, and for internal welding (the electrodes being urged to separate from one another), due to the adjustability of the electrode shafts and the means for controlling the electrode pressure, as well as to the exchangeability of the electrode holders in accordance with the various special purposes.

With the above and other objects in view to appear hereinafter, my invention consists in the novel features of construction, and the novel arrangement and combination of parts to be hereinafter described and illustrated in the accompanying drawings showing selected embodiments of my invention.

In the drawings:

Fig. 1 is a perspective view of a pair of welding tongs on a portable and adjustable frame according to the principle of the invention.

Fig. 2 is a horizontal section through the welding set as shown in Fig. 1.

Figs. 3 to 5 illustrate welding sets with modified means for carrying and controlling the electrodes.

Figure 6:
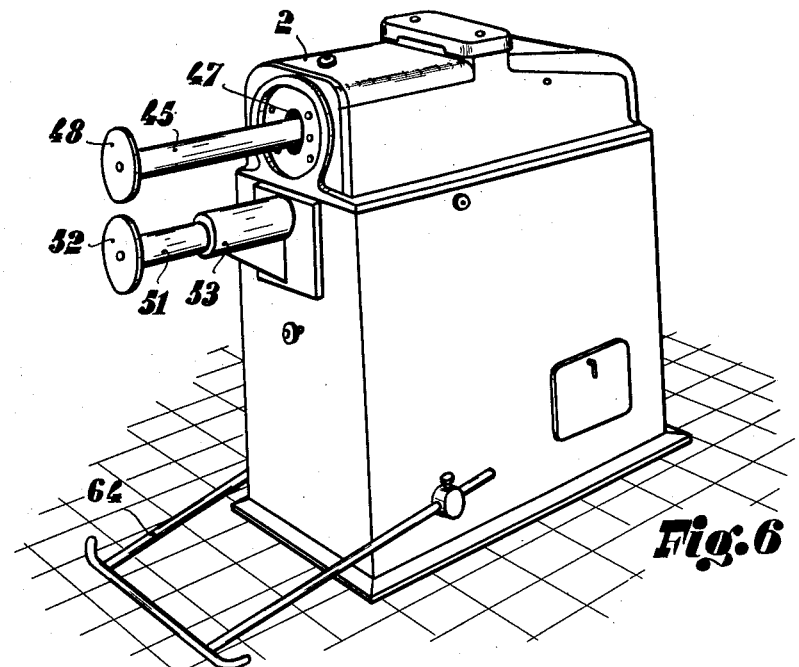
Figs. 6 to 8 show two embodiments of the welding machine of the stationary type.

Referring to Fig. 2 the transformer is formed of the primary winding 1 and the casing 2, the latter serving as secondary, thus being constructed as single way transformer in order to save weight. The two electrodes 3 are carried by the electrode holders 4 and 5 respectively, the first being directly fixed to the head 6 of the casing whereas the other is supported by the electrode arm 7, which is arranged in the axis of the transformer. This arm extends freely through an opening 8 of the head 6 and is carried by an elastic plate 9 forming a partition of the casing, but it may as well form the bottom of the same. When the electrodes are opened or closed, the holder 5 together with the arm 7 is laterally inclined, which movement is rendered possible due to elasticity of the plate 9. The said lateral movement of the electrode arm 7 is controlled by two pushes acting to both of its sides respectively near its free end. The electrodes are held in separated position when out of work by a pressure spring 10, and may be closed or pressed against the two sides of the work to be welded by means of hydraulic or pneumatic pistons 11 to be switched in by a handle 12 formed into a turning valve continuously controlling the desired pressure of electrodes.

In order to carry out welding in due order it is necessary to switch in the welding current only after the electrodes having reached their final positions that is after attaining the appropriate electrode pressure. To this end the turning handle 12 is coupled to the switch in order to effect closing of current only after the turning handle has reached its final position in the direction of switching in the piston, that is after the full electrode pressure has been established.

14 is another handle for carrying the welding tongs and 15 is the current supplying cable. In producing the electrode pressure by operating the turning handle, the electrode arm 7 is urged against the spring 10 compressing the same, thus bringing about the required pretension for the subsequent opening of the electrodes when the pressure piston is disengaged.

According to the embodiment as illustrated in Fig. 1 the supporting pillar 16 of the portable frame 17 is formed into an intermediate container for compressed air and carries the controlling valve 18 on its top. The adjustability of the welding tongs is secured by the parallelogram guide bars 19, 20, which are balanced by a counterweight 21. Adjustability into any desired position is secured by the three axes 22, 23 and 24 of a Cardan joint. The electric and hydraulic supply means are omitted in Fig. 1 for simplicity sake.

According to another embodiment of the invention the bottom plate is rigid whereas the arm 7 is formed by a bar elastic to bending stresses.

The disposition of the pressure means and the manner of operation may be the same as already described above. In order to enable the electrode arm to be displaced about a larger angle it is also possible to render elastic both the bottom of the casing or the partition and the electrode arm.

According to another embodiment of the invention the dimensions of the elastic parts are selected in such manner that their elastic forces totally or at least partly generate the electrode pressure and the forces for opening the electrodes.

It is possible, of course, to coordinate the two pressing means to the working steps in a manner different from that shown in Fig. 2, i. e. to use the hydraulic or pneumatic means for opening the electrodes and the pressure spring for closing the same. In such case preferably the pressure of the spring is adjustable or the spring may be adjusted to the required electrode pressure by means of a set screw.

A construction of this type is illustrated in Figs. 3 and 4, the fundamental construction being the same as shown in Fig. 2. The bottom 25 of the casing is formed by a rigid plate whilst the electrode arm is made of a bar 26 which is elastic to torsion stresses, and forming the main spring for producing the electrode pressure. The electrode holders 4, 5 are perpendicular with respect to the wall of the casing 2. Opening of the electrodes is effected by the pressure piston 11. The additional spring 10 can be adjusted by means of a handle 14 and a nut 27, and is adapted for easy regulation of the electrode pressure.

The construction shown in Fig. 5 comprises an elastic plate 28, the centre of which is connected with the electrode arm 7. The latter is connected to the electrode holder 5 which is hinged to the casing 2. The arm 7 has to be elastic as far as not to impair the movability of the holder 5. Opening of the electrodes is effected by exerting a pressure to the elastic plate 28 by means of a bag containing a compressing medium or a diaphragm 29. As such medium, for instance, cooling water may be used which is supplied simply by a branch pipe from the main which has to be provided in any case, thus a separate reservoir being not necessary. Cooling water and pressure water may be supplied in series or in parallel.

In case of supplying in parallel there is provided a suitable throttle governing securing the full pressure of the main to be present in the water for pressure purposes. It is also possible to combine supplies in series and in parallel, the used pressure water being available for increasing the usual water cooling.

Using the cooling water as compressing means is of course adaptable also in the previously described constructions.

In addition to the supporting means as shown in Fig. 1, there are others known per se which can be used for hand operated welding tongs, for instance swivel arm-, pendulum- or Cardan supporting in various constructions and combinations.

Figure 7:
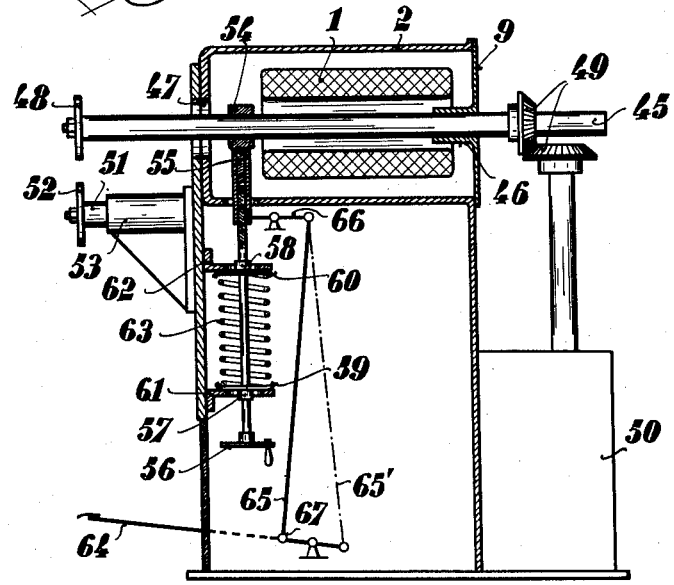

Figs. 6 and 7 illustrate by way of example a roller seam welding machine in a perspective view and vertical section respectively, the said machine being constructed according to the fundamental features of my invention. In this construction too the casing 2 surrounding the primary winding 1 of the transformer is adapted to form the secondary, and the elastic rear wall 9 of the said casing serves to transmit the secondary current to the driven and movably arranged electrode shaft 45 as well as to provide for oscillations of the said shaft due to the elasticity of the rear wall.

In order to secure satisfactory passage of current to the movable electrode shaft the latter is running in a long hub 46 of the wall 9. At the opposite end of the casing the shaft 45 extends through a longitudinal slot 47 of the front wall of the casing, and carries an electrode roller 48. The shaft propelled by a pair of bevel wheels 49 and a continuously adjustable gear which is disposed in the gear box 50. Preferably the shaft is provided with an axial hole thus facilitating supply and carrying off the cooling water.

Below the driven shaft 45 there is disposed a loose shaft 51 carrying the electrode roller 52 opposite to the aforesaid roller 48, and mounted for rotation in a bracket 53 which is vertically adjustable in order to be adjusted to the height of the work, for instance in welding of sheet metals to U-irons or angle irons.

In order to adapt the projection of the two rollers to the shape of the work the two shafts may be axially displaceable in their bearings up to a certain degree.

The two electrode rollers are fixed to the ends of the respective electrode shafts by a single screw each, thus being capable of being easily exchanged for spot welding electrodes, in which case the electrode shafts are secured against rotation and their driving gear is disengaged.

The following device is provided for adjusting the electrode pressure. Near the front wall of the casing the shaft 45 extends through a boss 54, the vertically downwards directed stem of the same being provided with a female thread engaging a screw spindle 55 carrying a crank at its lower end. Two stops 57, 58 are fixed to the spindle abutting to the spring-plates 59, 60 respectively, the path of which is limited by brackets 61, 62 fixed to the wall of the casing. Between the two spring-plates there is provided a tension spring 63. By operating the crank 56 the spindle is screwed into or out of the stem resulting in the adjustment of the tension of the spring as well as that of the direction of action of the spring beyond a minimum pretension. Therefore the means described above provide on the one hand for adjustment of the intensity of the electrode pressure in a simple way, on the other hand for inverting the direction of the spring action, i. e. to adapt the spring alternatively to cause the electrodes to act against one another or to separate from each other. The first manner of operation is used in welding flat parts or seams of vessels or tubes, the other one is required for instance in welding a flange to a tube.

Opening of the electrodes is effected by a pedal 64 acting by gear rods 65, 66 on the boss 54. By changing the connection of the rod 65 with the pedal 64 the latter is alternatively rendered one-armed (position 65) or two-armed (position 65'), thus inverting the direction of action of the rod 66 and the boss 54 in the accordance with the just used direction of the action of the spring 63. Instead of re-fixing the pivot 67, two pivots coupled to one another may be used, one of the same being capable of freely running in a slot of the rod. In such case changing of the connection is effected by deriving automatically the operation of the pivot movement from one of the two spring-plates.

According to the invention the electrode holder of the loose running electrode is exchangeable, thus the form of electrodes according to the conditions of each case may be used, resulting in a universal welding machine adapted to any of the positions of the welding seams on the work.

Figure 8:
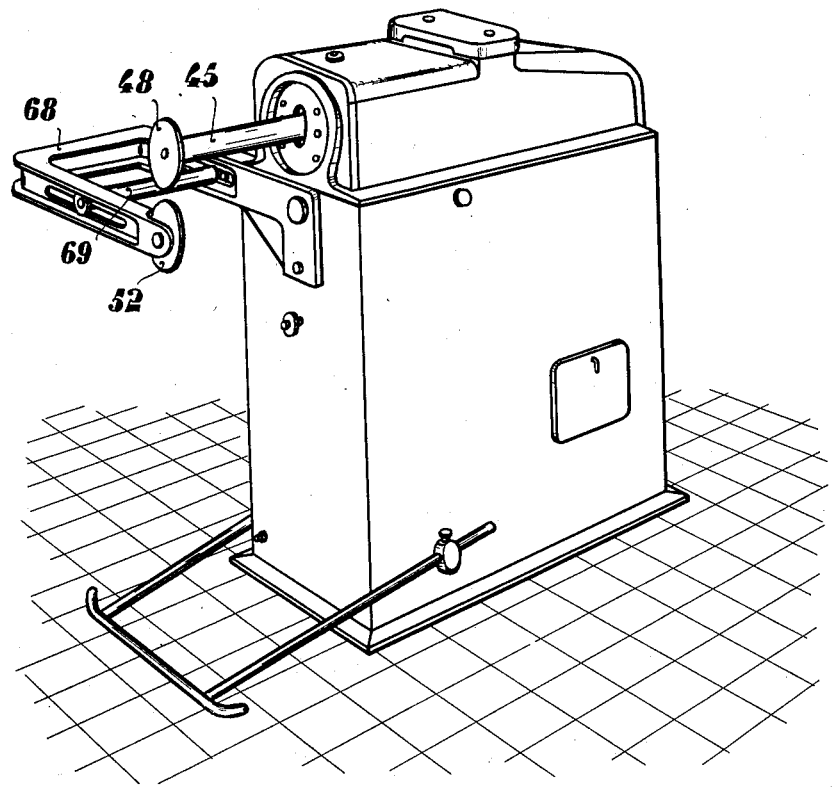

Fig. 8 illustrates a machine of that type. This machine differs from that as shown in Fig. 6 by the provision of a U-shaped horizontally disposed bow 68 replacing the bracket 53 and being fixed to the casing of the machine, thus enabling welding of longitudinal seams of vessels and tubes whereby the hitherto usual troublesome driving means of the electrodes are dispensed with.

In order to shorten the path of current an adjustable bridge 69 is provided which is capable of being inserted into the bow or of being adjusted on the bow thus adapting the free length of the electrode holder to the length of the work.

According to another embodiment of the invention there is provided a separate bearer for supporting the second electrode roller replacing the bow 68, and being placed beside the machine casing and electrically connected with the same.

In another construction of the roller seam welding machine according to the invention the bow or the separate bearer of the roller is cranked in such way that it extends into the path of the welding seam and is formed into a sufficiently narrow strip in welding tubes of any length enabling the two open edges of the sheet metal to pass by the two sides of the strip respectively.

Furthermore other embodiments of the invention may be devised which are not mentioned here.

What I claim as my invention is:

1. An electric resistance welding machine for spot welding and seam welding, comprising a transformer having a primary winding, a casing surrounding said primary winding and serving as secondary winding and being electrically connected to electrodes; electrode holding means directly connected to said casing; said holding means of at least one of said electrodes comprising an elastic portion in order to form for the secondary current a complete electrical connecting path of mechanically compact character, the holder of one electrode being a U-shaped bow and a rigid current bridge being adjustably inserted between the bent ends of the bow in order to shorten the path of the current.

2. An electric resistance welding machine for spot welding and seam welding, comprising a transformer having a primary winding, a casing surrounding said primary winding and serving as secondary winding and being electrically connected to electrodes; electrode holding means directly connected to said casing; said holding means of at least one of said electrodes comprising an elastic portion in order to form for the secondary current a complete electrical connecting path of mechanically compact character, the holder of one of the electrodes being a separate bearer and a rigid current bridge being adjustably inserted between the bearer and the casing in order to shorten the path of the current.

3. Electric resistance welding machine comprising a transformer having a primary winding and a casing having unmovably connected portions, said casing surrounding the whole transformer without the secondary winding and serving as secondary winding of the transformer; two electrodes, electrode holding means for each electrode, said electrodes being directly and without articulation connected with said electrode holding means; said electrode holding means being directly and without articulation connected with said casing; at least one of said electrodes being connected by an elastic portion with said casing, and being adapted to be applied without articulations to, and taken from, articles of varying thickness, the path of the secondary current being formed by said casing, said electrode holding means and said electrodes, said elastic portion being an elastic electrode holding means arranged directly between the electrode and the casing and consisting of an elastic arm adapted to be stressed by torsion.

4. An electric resistance welding machine as claimed in claim 1, having two electrode rollers for seam welding, in which said resilient part of the holding means of one electrode, arranged between electrode and casing, is a resilient plate which is rigidly connected at its edge to the casing and in which a rotatably driven electrode roller shaft, extending co-axially through the primary winding from the casing, is journaled.

5. An electric resistance welding machine as claimed in claim 3, in which said resilient part of the holding means of one electrode, arranged between electrode and casing, consists of a bar which is resilient to torsion stresses, co-axially arranged in the transformer and has one of its ends fastened to a rigid bottom portion of the casing, while the other of its ends projects from the casing and carries the electrode holder proper of a movable electrode.

6. An electric resistance welding machine as claimed in claim 1, comprising two electrode rollers for seam welding, a shaft carrying one of said rollers, a boss displaceable by a rod gear, said shaft extending through said boss, two spring plates arranged between stops fixed to the case of the machine, a tension spring, acting between the two spring plates, and adjustable stops on the rod of the boss acting on the spring plates and means for adjusting the last mentioned stops.

7. An electric resistance welding machine for spot and seam welding, wherein the casing of a supply transformer forms an essential portion of the secondary of the said transformer, the electrodes being connected with the peripheral surface of the said casing without articulations by holding means, the holding means of at least one of the electrodes comprising at least one resilient part, and the holding means of both electrodes being otherwise rigid, said resilient part of the holding means of one electrode, arranged between electrode and casing, being a resilient plate which is rigidly connected at its edge to the casing and carries the movable electrode arm coaxially extending from the casing through the primary winding, to the movable electrode.

8. An electric resistance welding machine for spot and seam welding, wherein the casing of a supply transformer forms an essential portion of the secondary of the said transformer, the electrodes being connected with the peripheral surface of the said casing without articulations by holding means, the holding means of at least one of the electrodes comprising at least one resilient part, and the holding means of both electrodes being otherwise rigid, an elastic partition being inserted in the casing, an arm connecting the partition to one of the electrodes and means being provided for supplying a pressure medium in the space between the bottom of the casing and the partition.

9. An electric resistance welding machine for spot and seam welding, wherein the casing of a supply transformer forms an essential portion of the secondary of the said transformer, the electrodes being connected with the peripheral surface of the said casing without articulations by holding means, the holding means of at least one of the electrodes comprising at least one resilient part, and the holding means of both electrodes being otherwise rigid, an elastic partition being inserted in the casing, an arm connecting the partition to one of the electrodes, a bag being arranged in the space between the bottom of the casing and the partition, and means being provided for supplying a pressure medium to the said bag.

References Cited in the file of this patent

UNITED STATES PATENTS

| Number | Name | Date |
|---|---|---|
| 391,441 | Warner | Oct. 23, 1888 |
| 1,213,174 | Fassler | Jan. 23, 1917 |
| 1,306,085 | Tornblom | June 10, 1919 |
| 1,645,705 | Ledwinka | Oct. 18, 1927 |
| 1,663,137 | Mack | Mar. 20, 1928 |
| 1,779,365 | Von Henke | Oct. 12, 1930 |
| 2,041,913 | Fassler | May 26, 1936 |
| 2,045,523 | Fassler | June 23, 1936 |
| 2,082,904 | Podany | June 8, 1937 |
| 2,269,726 | Martin | Jan. 13, 1942 |
| 2,369,294 | Harris | Feb. 13, 1945 |
| 2,376,692 | Heim | May 22, 1945 |
| 2,426,280 | Nichols | Aug. 26, 1947 |

FOREIGN PATENTS

| Number | Country | Date |
|---|---|---|
| 19,512 | Great Britain | Feb. 19, 1914 |
| 334,913 | Germany | Mar. 21, 1921 |
| 414,863 | Germany | June 8, 1925 |
| 591,360 | Germany | Jan. 20, 1934 |
| 697,193 | Germany | Oct. 8, 1940 |